No. 723,851. PATENTED MAR. 31, 1903.
W. FERGUSON.
COMBINED CREAM SEPARATOR AND CHURN.
APPLICATION FILED OCT. 16, 1902.
NO MODEL. 2 SHEETS—SHEET 1.
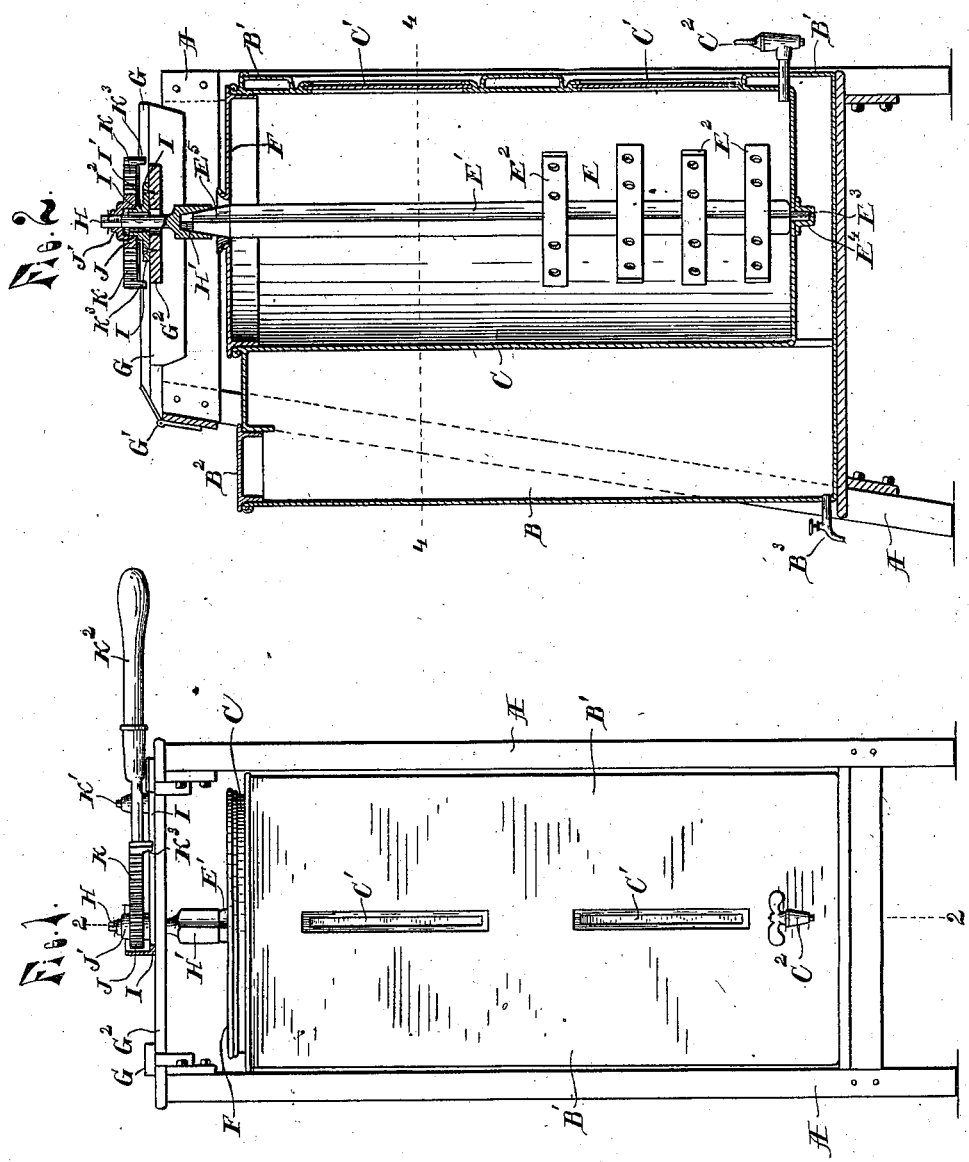
WITNESSES.
Lewis E. Flanders
Thomas S. Longstaff
INVENTOR.
William Ferguson,
By
Attorneys.

No. 723,851. PATENTED MAR. 31, 1903.
W. FERGUSON.
COMBINED CREAM SEPARATOR AND CHURN.
APPLICATION FILED OCT. 16, 1902.
NO MODEL. 2 SHEETS—SHEET 2.
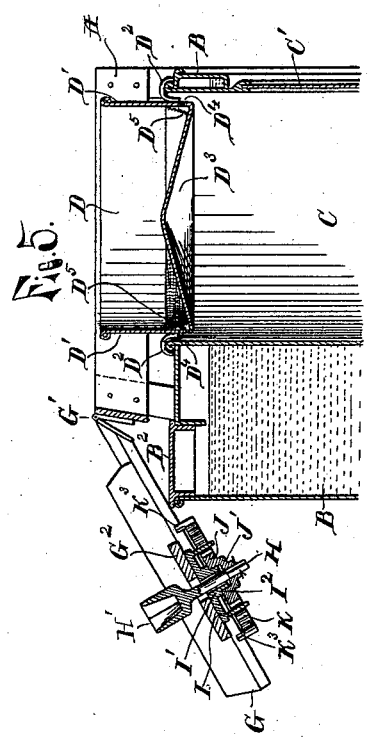
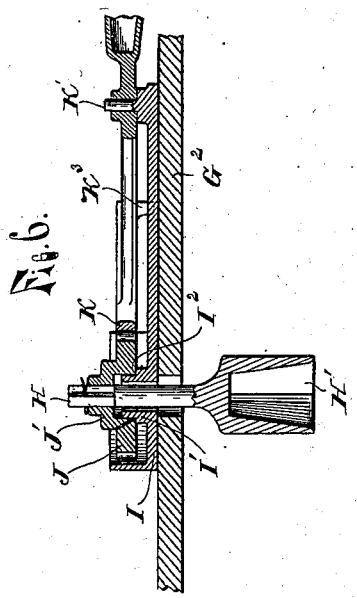
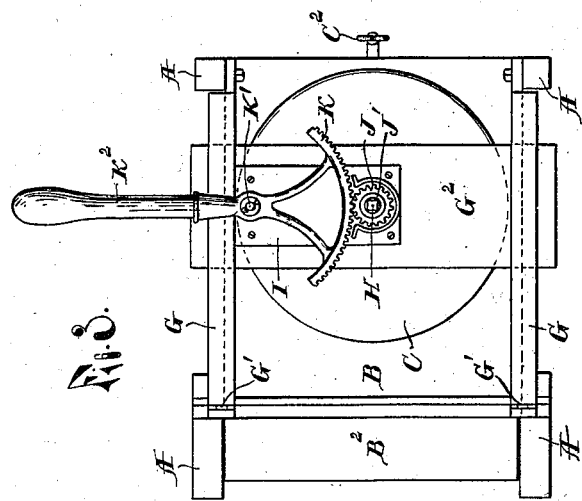
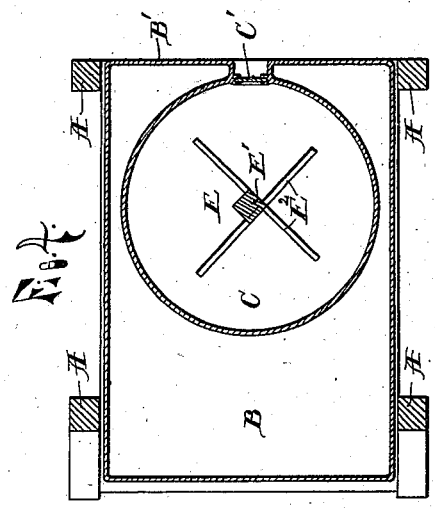
WITNESSES
Lewis E. Flanders
Thomas G. Longstaff
INVENTOR.
William Ferguson
By
Attorneys.

UNITED STATES PATENT OFFICE.

WILLIAM FERGUSON, OF CASS CITY, MICHIGAN.

COMBINED CREAM-SEPARATOR AND CHURN.

SPECIFICATION forming part of Letters Patent No. 723,851, dated March 31, 1903.

Application filed October 16, 1902. Serial No. 127,459. (No model.)

*To all whom it may concern:*

Be it known that I, WILLIAM FERGUSON, a citizen of the United States of America, residing at Cass City, in the county of Tuscola and State of Michigan, have invented certain new and useful Improvements in a Cream-Separator and Churn Combined, of which the following is a specification, reference being had therein to the accompanying drawings.

This invention relates to an improved combined cream-separator and churn; and its object is to provide a receptacle for the milk which is so arranged within an outer cooling-tank that the cooling medium will have free access to all sides of the receptacle or can, and at the same time the contents of said milk-can may be seen through sight-glasses in the side thereof and free access had to both can and tank.

It is also an object of this invention to so construct a strainer to be supported within the upper end of the can that the milk will be directed in small streams outward against the sides of the can and be thoroughly cooled as it spreads out and runs down thereon and at the same time will be aerated by the current of air and vapor passing upward between the side of the can and strainer.

A further object of this invention is to provide an agitator which may be readily detached when not in use and the operating mechanism of which is so constructed and secured to a suitable support hinged to the frame that it may be turned out of the way to give free access to the can; and it is also an object of this invention to provide convenient and easily-operated mechanism for imparting a reciprocating rotary motion to the agitator and to provide the device with certain other new and useful features, all as hereinafter more fully described, and particularly pointed out in the claim, reference being had to the accompanying drawings, in which—

Figure 1 is a front elevation of a device embodying my invention; Fig. 2, a longitudinal vertical section of the same on the line 2 2 of Fig. 1; Fig. 3, a plan view; Fig. 4, a transverse section on line 4 4 of Fig. 2; Fig. 5, a detail showing the upper end of the device in section with the agitator removed, the operating mechanism thrown back, and the strainer, also in section, placed in position within the top of the can; and Fig. 6 is an enlarged detail showing the operating mechanism in section.

A is a suitable frame, B a rectangular tank supported thereon, and C a cylindrical tank or can secured within the rectangular or cooling tank, with one side adjacent to the end wall B' of said tank, which wall is cut away opposite the sight-glasses C' of the can and the wall carried in around the openings to make a water-tight connection between the wall B' and the can around the sight-glasses. The tank is provided with a top through which the upper end of the can projects and in which is an opening closed by a cover $B^2$, and faucets $B^3$ $C^2$ are provided in the bottom of the tank and can, respectively, to draw off their contents.

The tank B is filled with cold water or ice and water, and when the can C has become sufficiently cooled thereby the strainer D (shown in Fig. 5) is placed in the top of the can and the warm milk poured into it. This strainer consists of a vertical wall or side D' of a diameter less than the diameter of the can, so that when suspended within the top of the can by the hooks $D^2$, which are secured to the strainer, there will be left a space between the side of the strainer and the can, and a conical bottom $D^3$ directs the milk toward the angle formed by the meeting of the bottom and side, through which side is a row of small openings $D^4$ to allow the milk to escape laterally in thin streams, a strip of wire-cloth $D^5$ being secured across the angle over the openings, through which cloth the milk is strained before reaching the openings, so that said openings will not become clogged. The number and size of these openings determine the rapidity with which the milk will be strained, and they direct the milk in small streams against the cold sides of the can, down which it flows, thus very rapidly cooling the milk and causing the cream to soon separate therefrom. The space around the strainer allows the air and vapor to pass out, and on entering the space it passes through the streams of milk issuing from the openings, and thus aids in cooling and aerates the milk. When a sufficient quantity of cream has been accumulated for a churning, the agitator E, consisting of a post E', provided with blades E² for agitating the cream, is placed in the can, with its center pin E³ in the socket E⁴, provided therefor in the axis of the can-bottom, and the cream poured in. A cover F, having an axial opening through which the upper end of the post E' extends, is placed on the can and the mechanism for turning the agitator connected thereto by turning the frame G, which is pivoted to the machine-frame at G', to bring the squared and tapered socket H' on the end of the vertical driver-shaft H into engagement with the upper tapered end E⁵ of the agitator-post. The pivoted frame G is provided with a transverse board G², through an opening in which extends the shaft H and to the upper side of which is secured the plate I, having a boss I' raised around the opening for the shaft, said boss being provided with a shoulder I² to support the gear J, which is cupped out at its under side to fit over the upper end of the boss I' and turn thereon. Said gear is provided with a hub portion J', having a squared opening to receive the squared end of the shaft H, to which it is secured by a key passed through a hole in the projecting end of said shaft. Integral with the plate I and inclosing the gear with its ends adjacent to the sector is an upwardly-extending wall forming a shield to prevent anything from getting in between the gear and sector. The plate I is also provided with an upwardly-extending pivot-pin K', and pivoted to turn on this pin is a horizontally-extending sector K in engagement with the pinion and provided with a horizontally-extending operating-handle K² for turning the sector on its pivot to rotate the pinion and agitator, said handle being extended some distance beyond its pivot to give an increased leverage. Stops K³ on the ends of the sector are provided to engage the plate and limit the movement of the sector.

By mounting the gear J upon the boss I', through which the shaft H passes loosely, the bearing may be oiled without danger of getting oil into the can, an oil-hole being provided in the gear, and by providing a tapered socket on said shaft to receive a tapered end on the agitator-post the driving mechanism may be easily and quickly detached from the agitator and thrown back, as shown in Fig. 5, to give free access to the can.

Moving the handle K² back and forth imparts a rotary motion first in one direction and then the other or a reciprocating rotary motion to the agitator which thoroughly stirs the cream and soon causes the butter to separate therefrom.

Having thus fully described my invention, what I claim is—

The combination with the supporting-frame; of a rectangular cooling-tank B provided with an opening in its top, a cylindrical can C secured within said tank with its side wall in proximity to the wall of the tank and projecting outward through the top of the same, a removable top F for the can provided with an axial opening, an agitator E having its upper end extending upward through the opening in the cover and tapered, a hinged frame G, a plate I having a hollow boss and secured to the hinged frame, a shaft H extending through said hollow boss and provided with a socket H', a gear J secured to the shaft, a shield on the plate partially inclosing the gear, a sector K pivoted on a pin on the plate and provided with a handle, and stops K³ on the ends of the sector, substantially as described.

In testimony whereof I affix my signature in presence of two witnesses.

WILLIAM FERGUSON.

Witnesses:
H. S. WICKWARE,
D. A. FREEMAN.